United States Patent [19]
Johnson

[11] Patent Number: 4,526,074
[45] Date of Patent: Jul. 2, 1985

[54] HIGH-SPEED APPARATUS AND METHOD FOR TRIMMING THERMOFORMED ARTICLES

[75] Inventor: David E. Johnson, Canandaigua, N.Y.

[73] Assignee: Mobil Oil Corporation, New York, N.Y.

[21] Appl. No.: 445,882

[22] Filed: Dec. 1, 1982

[51] Int. Cl.³ .............................................. B26F 1/40
[52] U.S. Cl. .................................. 83/97; 83/228; 83/556
[58] Field of Search .................... 83/96, 97, 148, 150, 83/227, 228, 566–570, 923, 142, 123–128

[56] References Cited

U.S. PATENT DOCUMENTS

| | | | |
|---|---|---|---|
| 1,062,028 | 5/1913 | Pierce | 83/569 |
| 1,082,985 | 12/1913 | Wilder | 83/124 X |
| 3,461,760 | 8/1969 | White | 83/97 X |
| 3,808,927 | 5/1974 | Neil | 83/228 |

Primary Examiner—James M. Meister
Attorney, Agent, or Firm—Alexander J. McKillop; Michael G. Gilman; Charles J. Speciale

[57] ABSTRACT

A high-speed apparatus and a method for successively trimming a plurality of thermoformed articles from a surrounding continuous web of a thermoformable foam plastic film material. A male locator urges the thermoformed articles molded into the web against a cutter so as to trim the articles from the web, with the articles being retained in a recess within the cutter. Subsequently trimmed articles form a state of nested articles within the recess.

9 Claims, 3 Drawing Figures

HIGH-SPEED APPARATUS AND METHOD FOR TRIMMING THERMOFORMED ARTICLES

BACKGROUND OF THE INVENTION

1. Field of the Invention

The present invention relates to a high-speed trim apparatus and to a method for the successive trimming of a plurality of thermoformed articles from a surrounding continuous web of a thermoformable foam plastic film material. More particularly, the invention contemplates the provision of a trim apparatus and of a method of utilizing the apparatus wherein the apparatus and method are designed to conform to the maximum output of a thermoformer.

2. Discussion of the Prior Art

In essence, various apparatus and methods are currently known and employed in industry for the trimming or severing of a plurality of thermoformed articles from a continuous web or sheet of a thermoformable foam plastic material in which the articles have been molded into the material web in a thermoformer. Generally, the web of material with the thermoformed articles molded therein is transported from the thermoformer at relatively high speeds and throughputs, and is then conducted into a trim press for the severing of the thermoformed articles from the web of plastic material. The trim press is usually constituted of a plurality of cooperating male and female members, such as complementary punch and dies which are conformed to the outer or peripheral configuration of each of the thermoformed articles, and are adapted to provide for concurrent trimming of a number of individual articles from the web. These cooperating male and female members of the trim press usually have a considerable physical mass and resultant high moment of inertia so as to constitute a limiting factor in the feasible total throughput of the entire thermoforming and trimming system.

SUMMARY OF THE INVENTION

In order to be able to significantly increase the operating speed of the trim apparatus so as to match the upper throughput limit of the thermoformers which mold the thermoformed articles into the continuous web of foam plastic material, the present invention contemplates the provision of a trim apparatus of the type described in which a sharpened serrated or toothed cutting blade structure having a relatively low mass is configured in conformance with the periphery of the thermoformed articles, for instance, in the shape of egg cartons, trays, cups or the like, which are to be cut or severed from the web of the thermoformable plastic material, and wherein the cutting blade structure forms a cavity in the shape of a "cookie cutter" which is adapted to capture the severed thermoformed article. A cooperating male locator is adapted to be reciprocated towards and away from the cutter into engagement with the cavity during the forward stroke thereof, and to thereby urge a thermoformed article which is in aligned position with the sharpened serrated cutter blade into engagement with the cutting edge of the blade, thereby causing the toothed cutting edge to pierce the web of plastic material and sever the thermoformed article. Concurrently, the male locator will force the severed thermoformed article which has been captured by the cutter into the cavity encompassed by the blade structure. Each subsequent severing operation, wherein a successive thermoformed article is aligned with the cutting blade structure and is urged against the cutting edge thereof upon the forward reciprocating stroke of the male locator will cause the preceding severed thermoformed article to be forced further into and through the cavity within the cutter structure, thereby producing a stack of trimmed thermoformed articles in a nested relationship which may then be removed manually or automatically for further handling or packaging.

Accordingly, it is a primary object of the present invention to provide an apparatus for the rapid severing or trimming of thermoformed articles in a successive manner from a surrounding continuous web of a plastic material.

It is another object of the present invention to provide a trim apparatus for successively trimming a plurality of thermoformed articles from a surrounding continuous web of a plastic film material wherein the thermoformed articles are aligned with the serrated or toothed cutting edge of a blade structure and are urged thereagainst by a male locator so as to sever the thermoformed article from the web, and to cause the severed article to be captured on the cutting blade structure.

Yet another object of the present invention is to provide a trim apparatus for thermoformed articles of the type described in which the male locator forces successively trimmed thermoformed articles into a cavity within the periphery of the blade structure to thereby form a nested stack from severed thermoformed articles.

Still another object of the present invention is to provide a method for successively and rapidly trimming a plurality of thermoformed articles from a continuous surrounding web of a plastic film material.

Yet another object of the present invention is to provide a method as described herein which utilizes a high-speed trim apparatus for severing in rapid sequence a plurality of thermoformed articles from a surrounding continuous web of a plastic film material, wherein the severed thermoformed articles are retained by the trim apparatus and formed into a stack of the nested trimmed articles.

BRIEF DESCRIPTION OF THE DRAWINGS

Reference may now be had to the following detailed description of an exemplary embodiment of the inventive self-aligning trim apparatus for severing thermoformed articles from a web of plastic film material into which the articles have been molded, taken in conjunction with the accompanying drawings; in which.

DETAILED DESCRIPTION

Figure 1:
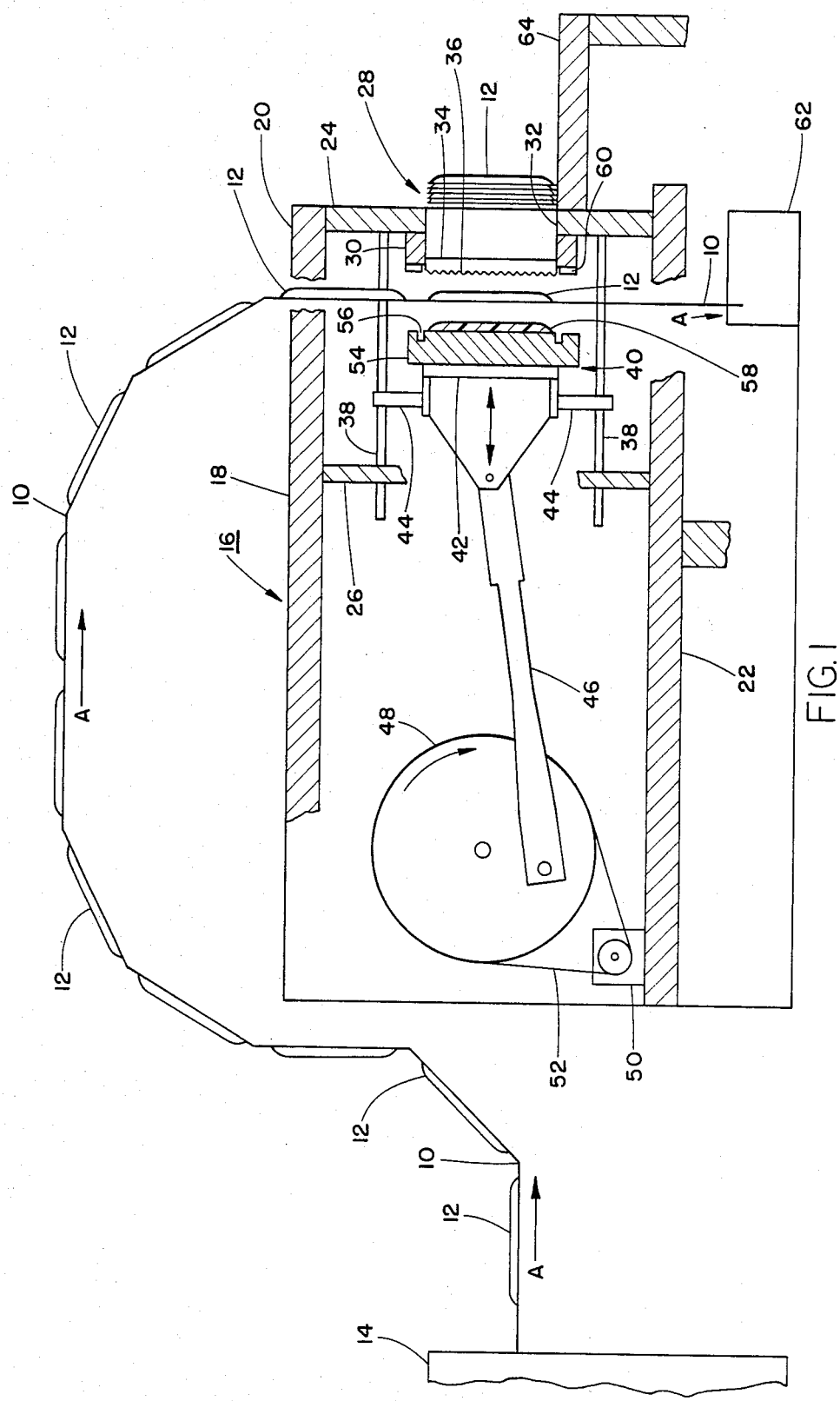
FIG. 1 illustrates in a generally schematic representation, a trim apparatus pursuant to the invention.

A continuous web or sheet of a thermoformable plastic sheet material 10 into which a succession of thermoformed articles 12 have been molded or thermoformed in a thermoformer 14 is conveyed in the direction of arrows A. The articles 12 may consist of moldings in the shape of, for instance, egg cartons, cups, trays or the like. The web 10 with the thermoformed articles 12 molded therein is conveyed in a predetermined intermittent manner through the intermediary of suitable feed or indexing devices (not shown) to a trim apparatus 16 constructed in accordance with the present invention.

The trim apparatus 16 comprises a stationary support frame 18 including horizontal frame support members 20 and 22 which are interconnected by upright support members 24 and 26. Supported by the vertical frame members 24 and 26 is a cutter arrangement 28 for trimming or severing the thermoformed articles 12 from the plastic material web 10, as is described in detail hereinbelow.

The cutter arrangement 28 includes, supported on the upright support member 24 which forms a stationary platen, a horizontally projecting mounting and spacer member 30 which defines a central opening or cavity 32 generally in conformance with the outer peripheral configuration of the thermoformed articles 12 which are to be severed from the plastic material web 10.

Figure 2:
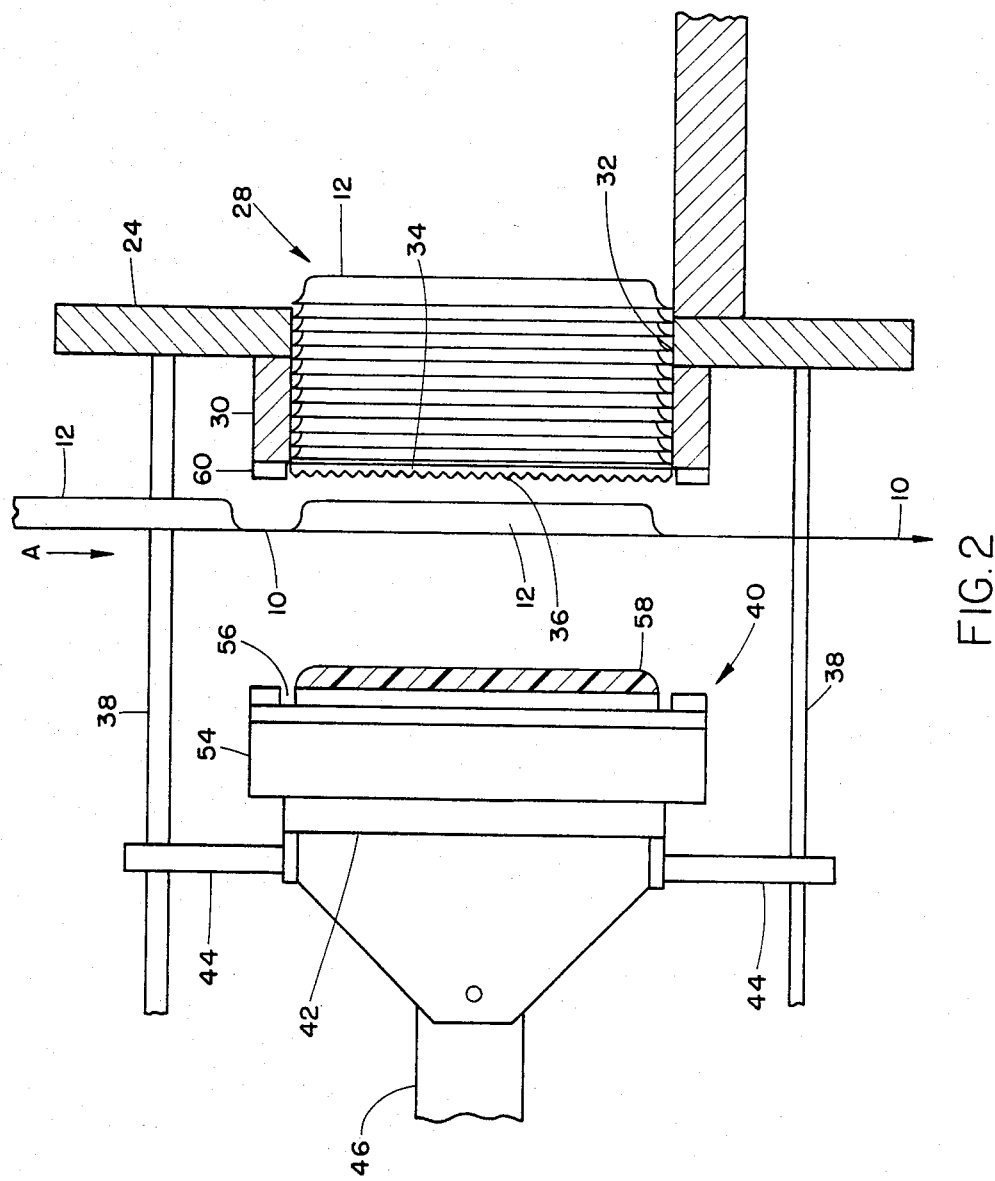
FIG. 2 illustrates on an enlarged scale the cutting blade structure of the inventive trim apparatus shown with the male locator in the retracted position thereof.
Figure 3:
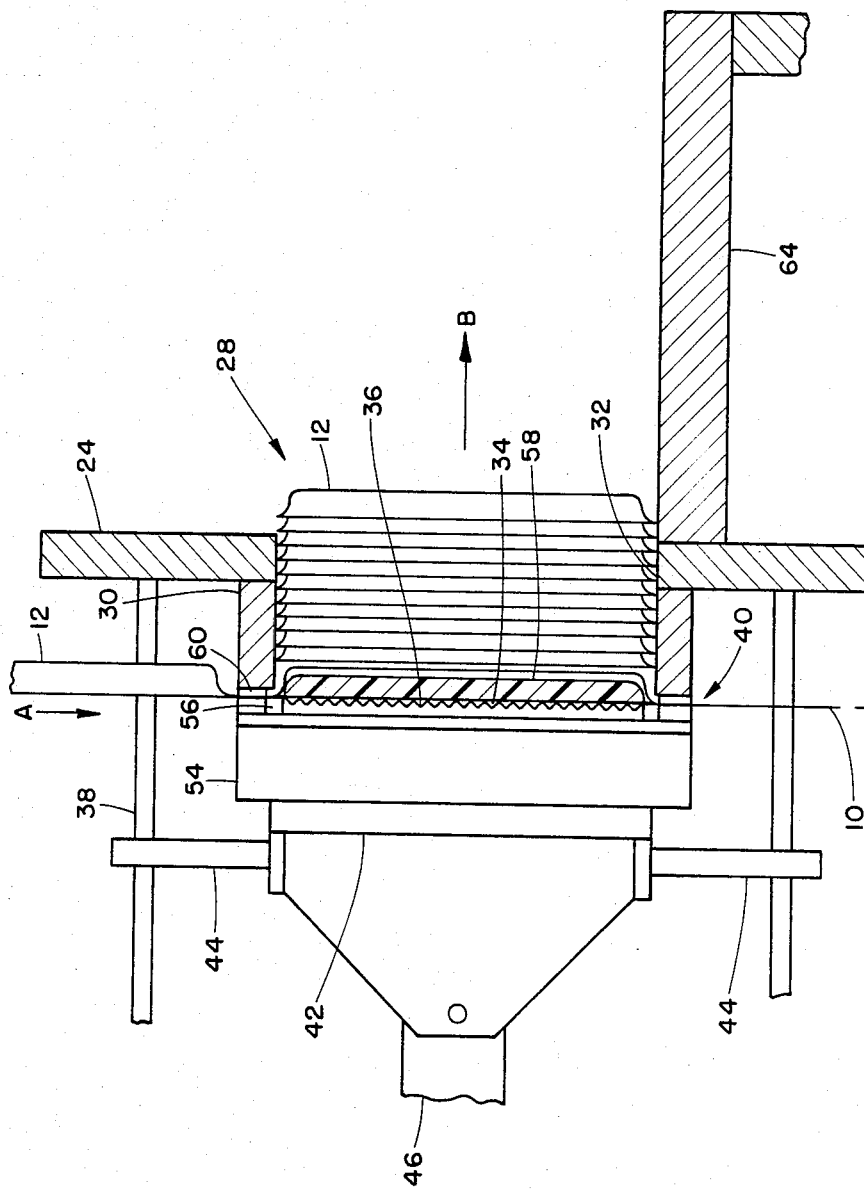
FIG. 3 illustrates a view similar to that of FIG. 2 with the male locator shown in the forwardly advanced position urging the thermoformed article onto the cutting edge of the cooperating cutting blade structure of the apparatus.

A cutting blade 34, as shown in greater particularity in FIGS. 2 and 3 of the drawings, is constructed of a thin tempered spring steel metal strip, and is fastened about the circumference of the opening 32 in the mounting and spacer member 30, and with the blade 34 including a serrated or toothed cutting edge 36 along its length facing towards the plastic material web 10.

Fastened to the upright member or stationary platen 24 are a plurality of horizontally extending guide rods 38 supporting a movable male part locator assembly 40 for reciprocatory movement towards and away from the cutter arrangement 28.

The male locator assembly 40 comprises a movable platen 42 which includes slide arms 44 adapted to be reciprocated along the guide rods 38 through the action of a crankarm or eccentric 46 which is activated by a rotatable flywheel 48. The flywheel 48 may be connected to a drive motor 50 through a suitable belt drive 52 which will translate the rotary motion of the flywheel 48 into the reciprocatory movement of the male locator assembly 40.

Fastened on the forwardly facing surface of the movable platen 42, in essence facing the cutter arrangement 28, is a male locator plate 54 which is encompassed by a recess 56 for receiving the toothed cutting edge 36 of the cutter blade 34 at the end of the forward stroke of the male locator assembly 40 towards the cutting arrangement 28. Fastened to the front surface of the plate 54 is a protruding element 58, which may be constituted of pliant bristles or a similarly resilient material and which is configured so as to conform with the interior dimensions of a thermoformed article 12 molded into the web 10 upon the forward stroke of the male locator assembly 40.

Extending about the cutting edge 36 of the cutter blade 34 is a sponge-like stripper 60 which is adapted to remove any trim scrap from the cutter blade 34 during the trimming operation by the apparatus.

Positioned below the cutting arrangement 28 is a scrap grinder 62 for receiving and processing of the plastic material web remainder from which the thermoformed articles 12 have been trimmed by the inventive apparatus.

The following is a detailed description of an operative sequence of the inventive thermoformed article trim apparatus 16:

The plastic material web 10 into which the thermoformed articles 12 have been molded is conveyed from the thermoformer 14 by a suitable feeding or indexing device (not shown) into the gap which is present intermediate the male locator assembly 40 and the cutting arrangement 28 when the former is in its retracted position, as is shown in FIG. 2 of the drawings. The feed device for the plastic material web 10 indexes the latter so as to position a thermoformed article 12 molded into the web 10 into alignment with the cavity or recess 32 defined within the periphery of the cutter blade 34.

Concurrently, the flywheel 48 is rotated in synchronism with the positioning of the article 12 in the gap to thereby advance the crankarm 46 forwardly so as to cause the movable platen 54 to slide along the guide rods 38 into engagement with the cutting arrangement 28. The throw of the the crankarm 46 during the rotation of flywheel 48 is calibrated so that, as illustrated in FIG. 3 of the drawings, the protruding element 58 which is fastened onto the front surface of the platen 54 will enter the thermoformed article 12 which is positioned in the gap in axial alignment therewith, and will urge the article 12 onto the serrated or toothed cutting edge 36 of the cutter blade 34, thereby causing the blade 34 to trim or sever the thermoformed article 12 from the plastic material web 10, with the thermoformed article 12 being retained or captured on the sharp points of the toothed edge 36 as would a socalled "cookie cutter". During this trimming sequence of the article 12, any scrap of plastic material which is formed about the serrated cutting edge 36 is brushed off the cutter blade by use of the wiping action of the sponge-like cushion 60 which extends about the circumference of the cutting edge portion of the cutter blade 34.

During the retractive movement of the male locator assembly 40 away from the cutting arrangement 28, the severed thermoformed article 12 is retained in position within the recess 32 by the serrated cutting edge 36 of the cutter blade 34.

In synchronism with the movement of the male locator assembly 40 being returned into its retracted position, as shown in FIG. 2 of the drawings, the web 10 is advanced so that a successive thermoformed article 12 therein is moved in the direction of arrows A into the gap into axial alignment with the assembly 40 and cutting arrangement 28 as described hereinabove. The article trimming sequence of the apparatus is now repeated, with the successively severed thermoformed articles 12 advancing the previously severed articles 12 into the cavity or recess 32 in the direction of arrow B, thereby causing the severed thermoformed articles 12 to produce a nested stack which slides onto a platform or a packing table 64 from which the stack may then be manually or automatically removed. The remaining portion of the plastic material web 10 from which the thermoformed articles 12 have been trimmed by the apparatus is advanced into a suitable scrap grinder 62 for further processing and/or recycling of the comminuted scrap material.

The cutter or trimming blade 34 may be fastened within the opening 32 in mounting member 30 through suitable fastening means, such as recessed or countersunk screws (not shown). The cutter blade 34 may be constituted of a thin strip of tempered spring steel having a thickness in the range of about 0.003 to 0.025 inches, and preferably, a thickness of about 0.001 inches, and includes a sharply-pointed toothed or serrated cutting edge 36, preferably having about 5 teeth for each linear inch of the blade length and with each cutting tooth subtending an angle of about 60 degrees to provide for optimum cutting performance and practically no blade wear.

The inventive trim apparatus 16 may be adapted for the trimming of differently configured thermoformed articles 12 from a plastic material web 10 by merely providing inserts within the cavity 32 in conformance with the external peripheral configuration of the thermoformed article 12, and with the cutter blade 34 being correspondingly shaped. This will also necessitate that the platen 54 with the protruding element 58 be replaced by another movable platen dimensioned in conformance with the internal configuration of the thermoformed articles 12, thereby imparting versatility to the apparatus in the trimming of differently configured thermoformed articles 12 from a web 10.

Although only a single thermoformed article trimming apparatus has been illustrated, it would be obvious to one skilled in the art that for a web 10 which includes a plurality of thermoformed articles 12 molded therein in a side-by-side or tandem relationship, an apparatus having a plurality of concurrently acting trimming arrangements 28 and 40 in tandem or side-by-side relationship may be located to provide for the concurrent trimming of a plurality of such thermoformed articles 12 during each forward advance of the male locator assembly 40 into engagement with the cutting arrangement 28.

While there has been shown and described what is considered to be the preferred embodiment of the invention it will of course be understood that various modifications and changes in form or detail could readily be made without departing from the spirit of the invention. It is therefore intended that the invention be not limited to the exact form and detail herein shown and described, nor to anything less than the whole of the invention herein disclosed as hereafter claimed.

What is claimed is:

1. A trim apparatus for successively trimming a plurality of thermoformed articles from a surrounding continuous web of a foam plastic film material, comprising:
   (a) stationary cutting means including a blade member encompassing a cavity in conformance with the peripheral dimension of each said thermoformed article, said cutting means comprising stationary platen means having a recess extending therethrough and forming said cavity, said blade member being fastened to said platen means so as to extend about the circumference of said recess;
   (b) male locator means having a protruding surface portion facing said blade member in axial alignment therewith, said protruding surface portion being dimensioned to conform with the interior dimensions of the thermoformed articles; means for reciprocating said male locator towards and away from said cutting means, said protruding surface portion extending into engagement with said cavity at the end of the forward stroke of said male locating means and being spaced from said cutting means at the return stroke thereof so as to provide a gap between said blade member and said male locator means, said male locator means further comprising a second recess encompassing said protruding surface portion, said second recess for receiving said blade member at said end of a forward stroke of said male locator means;
   (c) and means for feeding said web of plastic film material in synchronism with the return stroke of said male locator means through the gap intermediate said trim knife means and said male locator so as to sequentially position thermoformed articles on said web in axial alignment intermediate said cutting means and said male locator means, whereby said protruding surface portion at the forward stroke of said male locator means urges said article onto said blade member so as to cause the latter to trim the article from said plastic web and to retain said trimmed article on said blade member within said cavity.

2. An apparatus as claimed in claim 1, said male locator means comprising a support platen; said protruding surface portion extending from said support platen towards the plastic web normal to the direction of conveyance of said plastic web.

3. An apparatus as claimed in claim 1, said means for reciprocating said male locator means comprising a rotatable flywheel, drive means for rotating said flywheel in synchronism with the feed of said web, and crankshaft means interconnecting said flywheel and said male locator means for translating the rotational movement of said flywheel into the reciprocatory movement of said male locator means.

4. An apparatus as claimed in claim 1, said blade member having a serrated cutting edge facing towards said plastic web and said male locator means so as to trim a thermoformed article positioned in alignment with said blade member during the forward stroke of said protruding surface portion of said male locator into said cavity.

5. An apparatus as claimed in claim 4, comprising stripper means extending about the outer circumference of the cutting edge of said blade member for removing trimmed plastic material scrap from said cutting means.

6. An apparatus as claimed in claim 5, said stripper means comprising a sponge-like cushion member.

7. An apparatus as claimed in claim 1, said blade member comprising a metal strip of tempered spring steel having a thickness in the range of about 0.003 to 0.025 inches.

8. An apparatus as claimed in claim 7, said blade member including a serrated cutting edge facing said male locator means, said edge having about five cutting teeth for each linear inch of blade length, each cutting tooth subtending a tooth angle of about 60°.

9. An apparatus as claimed in claim 1, said male locator means sequentially advancing successively trimmed thermoformed articles into the cavity of said blade member to produce a stack of nested thermoformed articles.

* * * * *